United States Patent [19]

Sakamoto et al.

[11] Patent Number: 5,069,326
[45] Date of Patent: Dec. 3, 1991

[54] CONVEYOR MEANS

[75] Inventors: Shunji Sakamoto; Toshihiko Hoshino, both of Hiroshima, Japan

[73] Assignee: Mazda Motor Corp., Japan

[21] Appl. No.: 554,034

[22] Filed: Jul. 17, 1990

[30] Foreign Application Priority Data

Jul. 20, 1989 [JP] Japan .................................. 1-189524
Jul. 20, 1989 [JP] Japan .................................. 1-189525
Jul. 20, 1989 [JP] Japan .................................. 1-189526
Jul. 20, 1989 [JP] Japan .................................. 1-189527
Jul. 20, 1989 [JP] Japan .................................. 1-189528

[51] Int. Cl.$^5$ .............................................. B65G 35/00
[52] U.S. Cl. .................................... 198/619; 104/292
[58] Field of Search ................... 198/619, 465.1, 465.2; 104/290, 292

[56] References Cited

U.S. PATENT DOCUMENTS

| 4,369,872 | 1/1983 | Sticht | 198/465.1 X |
| 4,718,539 | 1/1988 | Fukuwatari et al. | 104/292 X |
| 4,769,580 | 9/1988 | Heidelberg et al. | 104/292 X |
| 4,841,869 | 6/1989 | Takeuchi et al. | 104/292 |

Primary Examiner—D. Glenn Dayoan
Assistant Examiner—Keith Dixon
Attorney, Agent, or Firm—Thompson, Hine and Flory

[57] ABSTRACT

This conveyor apparatus, when conveying articles between adjoining stations, under the control of the control device on the basis of conveying state conveyance is carried out by driving by both the linear motor unit and the servomotor unit in at least one of the low speed regions (acceleration region at the initial stage of conveyance and deceleration region at the last stage of conveyance) and by driving by the servomotor unit in the intermediate region at the intermediate stage of conveyance. Therefore, conveyance in the low speed region is assisted by the linear motor unit which generates large thrust, with the result that acceleration and deceleration in the low speed region are enhanced effectively and no deviation is caused at each speed change point by the servomotor unit of high positioning precision.

9 Claims, 14 Drawing Sheets

CONVEYOR MEANS

BACKGROUND OF THE INVENTION

1. Field of the Invention

This invention relates to a conveyor means for conveying articles at a production line, etc., particularly to a conveyor means using linear motors.

2. Description of the Prior Art

From the viewpoint of increasing the production efficiency and improving the working environment, it has been desired recently at the production lines of manufacturing plants to convey articles speedily and silently. A conveyor means developed to meet such requirements using linear motors, each comprising linear coils and a reaction member, is known. Such conveyor means has the following construction.

As shown in FIG. 16, linear motor coils 92 which, together with a reaction member 93, compose a linear motor 91 are made stators or fixed elements, which are arranged along a roller conveyor 95 comprising a plurality of rollers 94, and the reaction member 93 comprises a rotor or a moving element which is fitted to a pallet 96 (an article to be conveyed) through the medium of a fitting member 97. By thrust F which is generated at the rotor (reaction member 93) due to electromagnetic action between the linear motor coils 92 and the reaction member 93, the pallet 96 and an article placed thereon are conveyed through the medium of the rotor (reaction member 93). In the conveyor means using linear motors of this kind, a controller is generally provided for the linear motor 91 of each working station and when the pallet 96 is conveyed between adjoining stations, a conveying speed for the pallet 96 detected by an encoder provided at each station is inputted to the controller for controlling the working of the linear motor 91.

Also, the Japanese Patent Application Laying Open Gazette No. 55-86307 discloses conveyor means using a DC servomotor of direct driving system using gears, etc. at each station for stopping an article being conveyed exactly at the specified position of each station. According to this conveyor means, when an article being conveyed approaches each station, driving by a linear motor is stopped and switched over to the driving by the servomotor so as to convey the article being conveyed to the stop position at each station.

In comparing the thrust-speed characteristic between the linear motor and the servomotor (rotary motor), as shown in FIG. 17, while the linear motor generates large thrust in a low speed region at starting, the servomotor generates large thrust in a high speed region after the lapse of the specified time from starting. From this fact, it is desirable for the driving means of a conveyor means to use a linear motor in a low speed region (an acceleration region where acceleration at the initial stage of conveyance is required and a deceleration region where deceleration at the last stage of conveyance is required) but to use a servomotor in high speed region where the speicfied speed (high speed) is maintained after acceleration, as shown in FIG. 18.

However, since the above linear motor is controlled in working on the basis of a conveying speed for the pallet grasped indirectly by pressing an encoder against the pallet through the medium of a roller or the like, there is caused slip between the pallet and the roller and therefore the control is substantially an open-loop control system and fluctuations of conveying speed in conveying a pallet can be caused as shown by a virtual line (two-point chain line) in FIG. 18, namely, there is caused a deviation at each speed change point (from the low speed region or the acceleration region by a linear motor to the high speed region or the fixed speed region by a servomotor and from the high speed region by a servomotor to the low speed region or the deceleration region by a linear motor). Therefore, the deceleration starting time varies to recover the conveying distance affected by the deviation at the speed change point. As a result, the conveying length of time stop position becomes irregular and control precision on conveyance as a whole becomes worse.

When a linear motor is used in the low speed region (acceleration region and deceleration region) where the speed control is difficult, the linear motor is controlled in working by a controller on the basis of the pallet conveying speed from the encoder and therefore a controller which is equipped with a complicated control apparatus must be used and a load on the control system (controller) of the linear motor becomes large, with the result that reliability of the control system of the linear motor lowers and the control system is easy to break down.

SUMMARY OF THE INVENTION

An object of the present invention is to provide a conveyor which uses both linear motors and servomotors effectively and efficiently for better precision of conveying control and high speed in the whole operation area.

Another object of the present invention is to prevent lowering of reliability and trouble of the control system of the linear motor also to simplify the control system of the linear motor.

A further object of the present invention is to make it possible to operate the conveyor even when either of the linear motor and the servomotor breaks down.

In order to attain the above objects, the conveyor means according to the present invention which conveys articles between adjoining stations of the production line is provided with a linear motor unit and a servomotor unit at each station, a conveying state detecting means which detects the state of articles being conveyed between adjoining stations, and a control means which receives output of the conveying state detecting means and controls working of the linear motor unit and the servomotor unit in such a way that conveyed articles are driven by both an linear motor unit and the servomotor unit in at least one of the acceleration region at the initial stage of conveyance and a deceleration region at the last stage of conveyance, but are driven by the servomotor unit in a fixed speed region at a conveyance intermediate stage.

Under the above composition, in the case where articles are conveyed between adjoining stations, conveyor motion is effected by both the linear motor unit and the servomotor unit in at least one of the acceleration region at the initial stage of conveyance and the deceleration region, at the last stage of conveyance (low speed region) and by the servomotor unit in the intermediate region at the intermediate stage of conveyance (high speed region), on the basis of the conveying state detected by the conveying state detecting means and under the control of the control means. More particularly, since the servomotor unit is always driving at the time of conveyance, conveyance by the linear motor unit is carried out only in the low speed region and the linear motor unit becomes substantially an open-loop but this open-loop is made up for by the servomotor unit having high positioning precision and no deviation is caused at a speed change point (from the acceleration region to the fixed speed region and from the fixed speed region to the deceleration region), with the result of improvements in stability of conveyance, stop position precision and conveyance control precision in all operation regions. Moreover, since conveyance in the low speed region is carried out by the sum of driving force of the linear motor unit and driving force of the servomotor unit, accelerating force and decelerating force in the low speed region are enhanced effectively.

Since the linear motor unit is controlled for switching only by ON/OFF and in the low speed region, control is effected by driving force by the linear motor unit and driving force by the servomotor unit which makes up for the driving force by the linear motor unit, control on the linear motor unit is effected only by switching between ON state where the maximum thrust is generated and OFF state where thrust by the servomotor unit is sufficient. Therefore, a controller equipped with complicated controlling apparatus which controls the linear motor unit on the basis of the conveying speed from the encorder is not required and a load on the control system of the linear motor unit is small. As a result, lowering of reliability of the control system of the linear motor unit can be prevented and trouble of the control system lessens. Moreover, since control on the linear motor unit can be effected only by switching of ON/OFF, the control system of the linear motor unit can be simplified in composition.

As mentioned above, since in the low speed region conveyance is carried out by driving by both linear motor unit and the servomotor unit and in the conveyance intermediate region conveyance is carried out by driving by the servomotor unit, even if either of the linear motor unit and the servomotor unit breaks down, conveyance can be maintained, more particularly, even if the linear motor unit breaks down, the servomotor unit is driving at all times during conveyance and even if the servomotor breaks down, conveyance up to a preceding station is possible owing to thrust of the linear motor unit.

The above objects and novel features of the present invention will be understood more clearly by reading the following detailed description, with reference to the accompanying drawings.

BRIEF DESCRIPTION OF THE DRAWINGS

The attached drawings show preferred embodiments of the present invention, in which:

FIG. 1 to FIG. 8 show schematically the first embodiment of the present invention, of which FIG. 1 is a side view of the conveyor means;

FIG. 2 is a plan view of the conveyor means shown in FIG. 1;

FIG. 3 is a cross section, taken along the line III—III in FIG. 1;

FIG. 4 is a front view of the gear box of the servomotor, as it is cut open;

FIG. 5 is a cross section, taken along the line V—V in FIG. 4;

FIG. 6 is a block diagram of the control part of the conveyor means;

FIG. 7 is an electric circuit diagram for computing the electric current command value; and FIG. 8 is a characteristic drawing showing the variations of speed when conveying a pallet;

FIG. 9 to FIG. 11 show schematically the second embodiment of the present invention, of which FIG. 9 is a block diagram of the control part of the conveyor means;

FIG. 10 is a flow chart showing the control flow; and

FIG. 11 is a characteristic drawing showing the variations of speed when conveying a pallet;

FIG. 14 and FIG. 15 show the fifth embodiment, of which FIG. 14 is a block diagram of the control part of the conveyor means; and FIG. 15 is a flow chart showing the control flow;

DETAILED DESCRIPTION OF THE INVENTION

A description is made below of each preferred embodiment of the present invention on the basis of the attached drawings.

Figure 1:
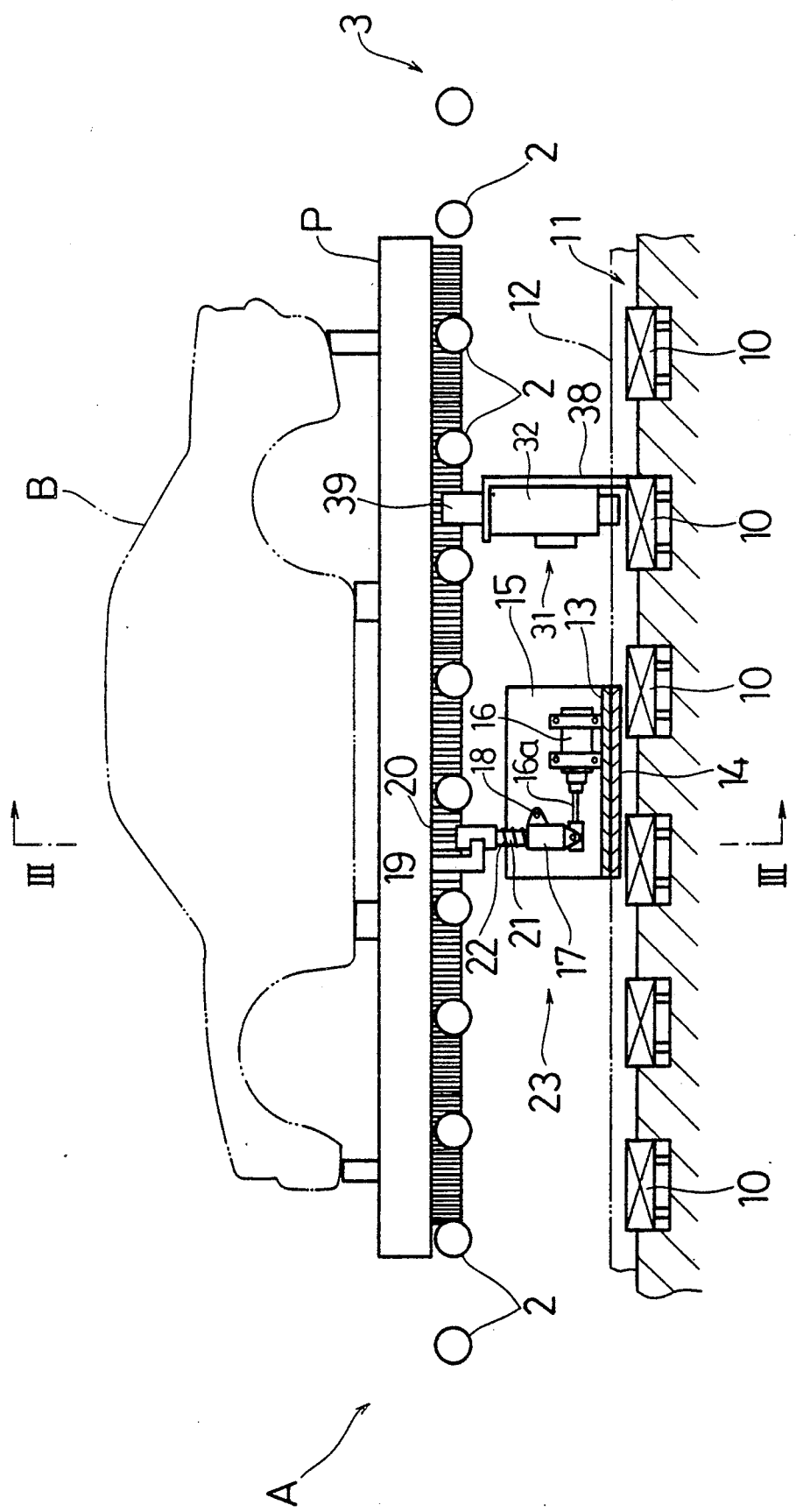
Figure 2:
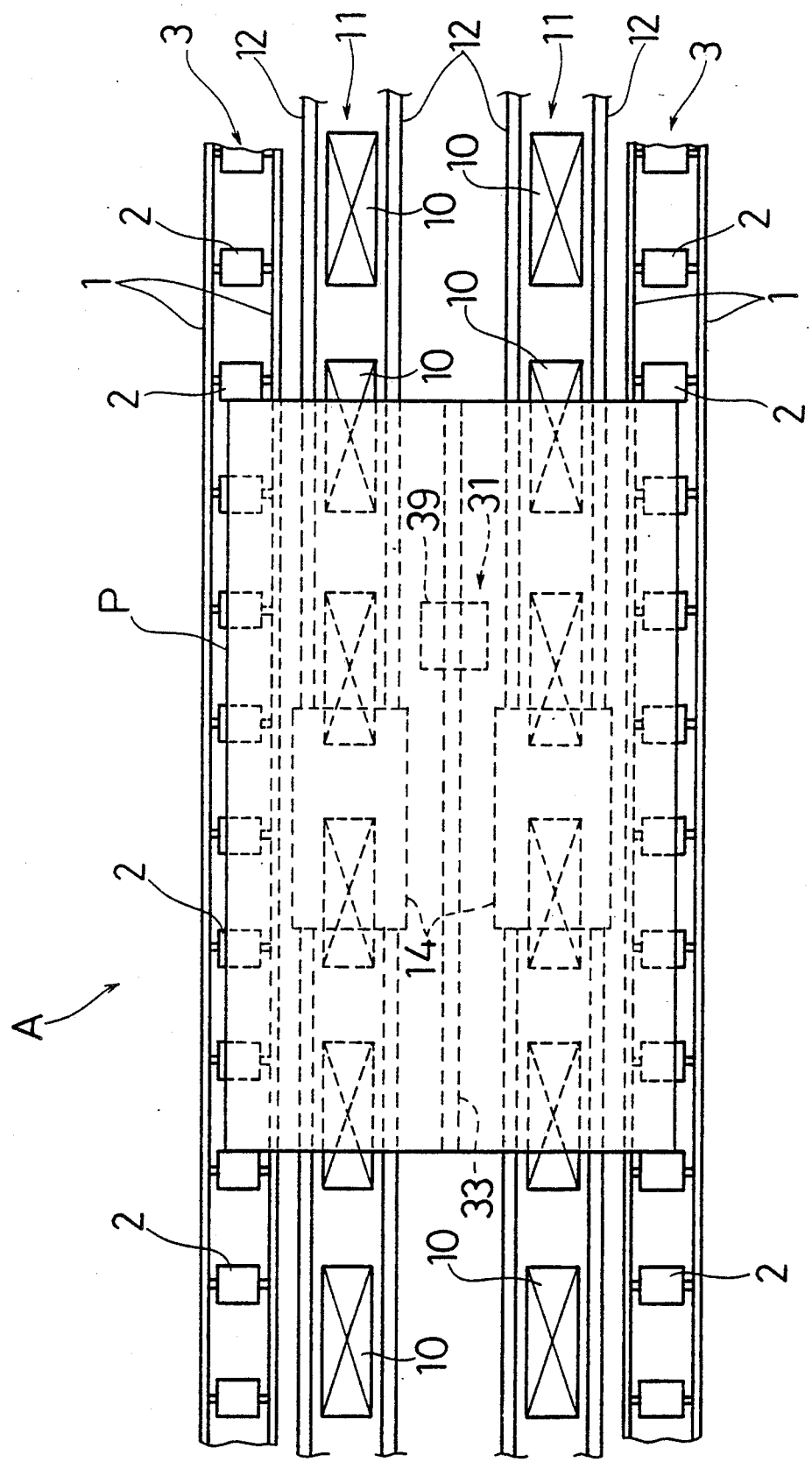
Figure 3:
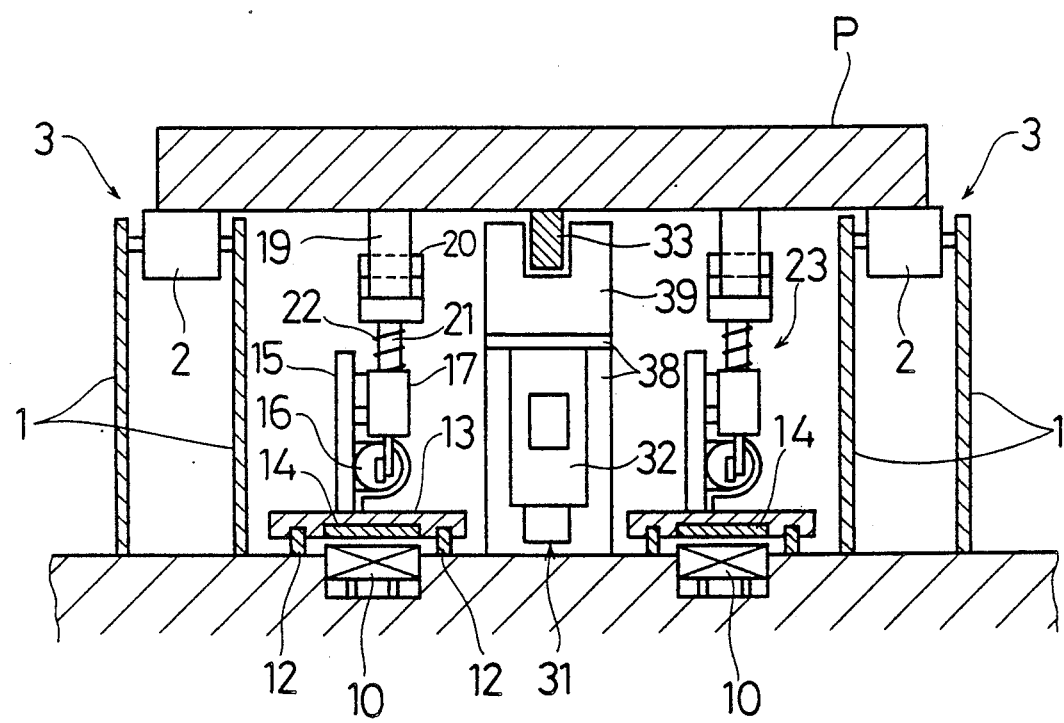

FIG. 1 to FIG. 3 show an embodiment of the present invention, in which a conveyor means A is applied to a vehicle assembling line. The conveyor means A conveys a pallet P with a body B placed thereon between adjoining working stations $ST_1$, $ST_2$ within the specified time. The pallet P is supported by a roller conveyor 3 comprising many rollers 2 fitted revolvably to support members 1 on both sides of the transporting line and is conveyed as it is sliding on the conveyor 3. Provided in parallel inside the above two support members 1 are two stator (fixed element) rows 11, each comprising many linear motor coils 10 which are stators (comb teeth-shaped iron cores around which exciting coils are wound). Provided on both sides of each stator row 11 are two guide rails 12. A reaction member 14 (to be described later) is guided by the guide rails 12 along the stator row 11.

A first plate 13 is engaged movably with the guide rails 12 on both sides of each stator row 11. A reaction member 14 (a rotor or a moving element which is, for example, a laminated sheet of iron and aluminium) is fitted to the under surface of the first plate 13. Fitted to the upper surface of the first plate 13 is a second plate 15 which extends upward. Provided at the second plate 15 is a cylinder 16 (in longitudinal direction) having a piston rod 16a which extends forwardly in conveying direction (to the left side in FIG. 1). Connected to a forward end of the piston rod 16a of the cylinder 16 is a tubular member 17. The tubular member 17 is supported revolvably about an axis 18 to the second plate 15. Inserted in the tubular member 17 is a base end portion of a rod 21 having at its forward end an engaging block 20 which is engagable with an engaging projection member 19 provided at the back surface of the pallet P. A coil spring 22 is wound round the rod 21.

The reaction member 14 provided at each stator row 11 is moved to a rear side in conveying direction along the stator row 11 by thrust which is generated by electromagnetic action between the reaction member 14 and each linear motor coil 10 of each stator row 11, whereby the body B on the pallet P (with its engaging projection member 19 engaged with the engaging block 20) is conveyed between adjoining working stations $ST_1$, $ST_2$ within the specified time. A linear motor unit 23 which is composed of the linear motor coils 10 and the reaction member 14 is provided at the rate of one for each station $ST_1$, $ST_2$.

Figure 4:
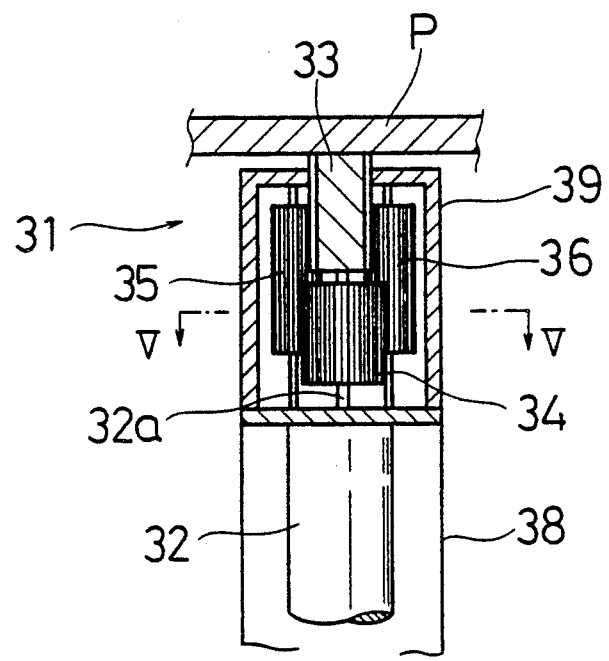
Figure 5:
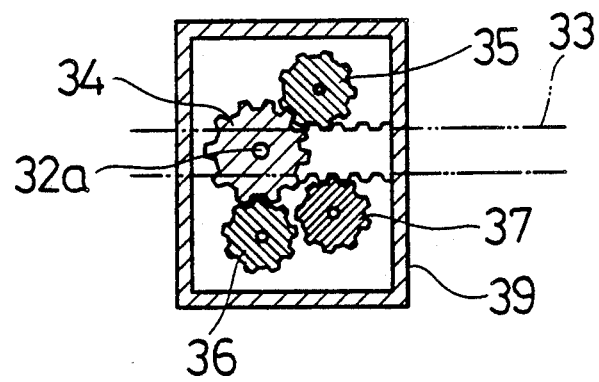

The conveyor means A is provided with a servomotor unit 31 as its driving means at each working station $ST_1$, $ST_2$, apart from the linear motor unit 23. As shown in FIG. 4 and FIG. 5, the servomotor unit 31 is provided with a servomotor 32 which is supported by a support table 38 between two stator rows 11 with an axis of rotation 32a facing upward, a rack member 33 with teeth part on both sides extending in lengthwise direction (conveying direction) at the undersurface of the pallet P and opposing the servomotor 32, servomotor 32, a second pinion 35 which engages with the first pinion 34 and a teeth part at one side of rack member 33, a third pinion 36 which meshes with the first pinion 34 at the position opposite to the second pinion 34 and a fourth pinion 37 which meshes with the third pinion 36 and a teeth part at the other side of the rack member 33. Under this arrangement, the conveyor means A conveys the pallet P by converting turing force of the servomotor 32 into driving force in linear direction by a series of pinions 34–37 and the rack member 33. The pinions 34–37 are conveyed with a gear box 39 provided on the support table 38.

Figure 6:
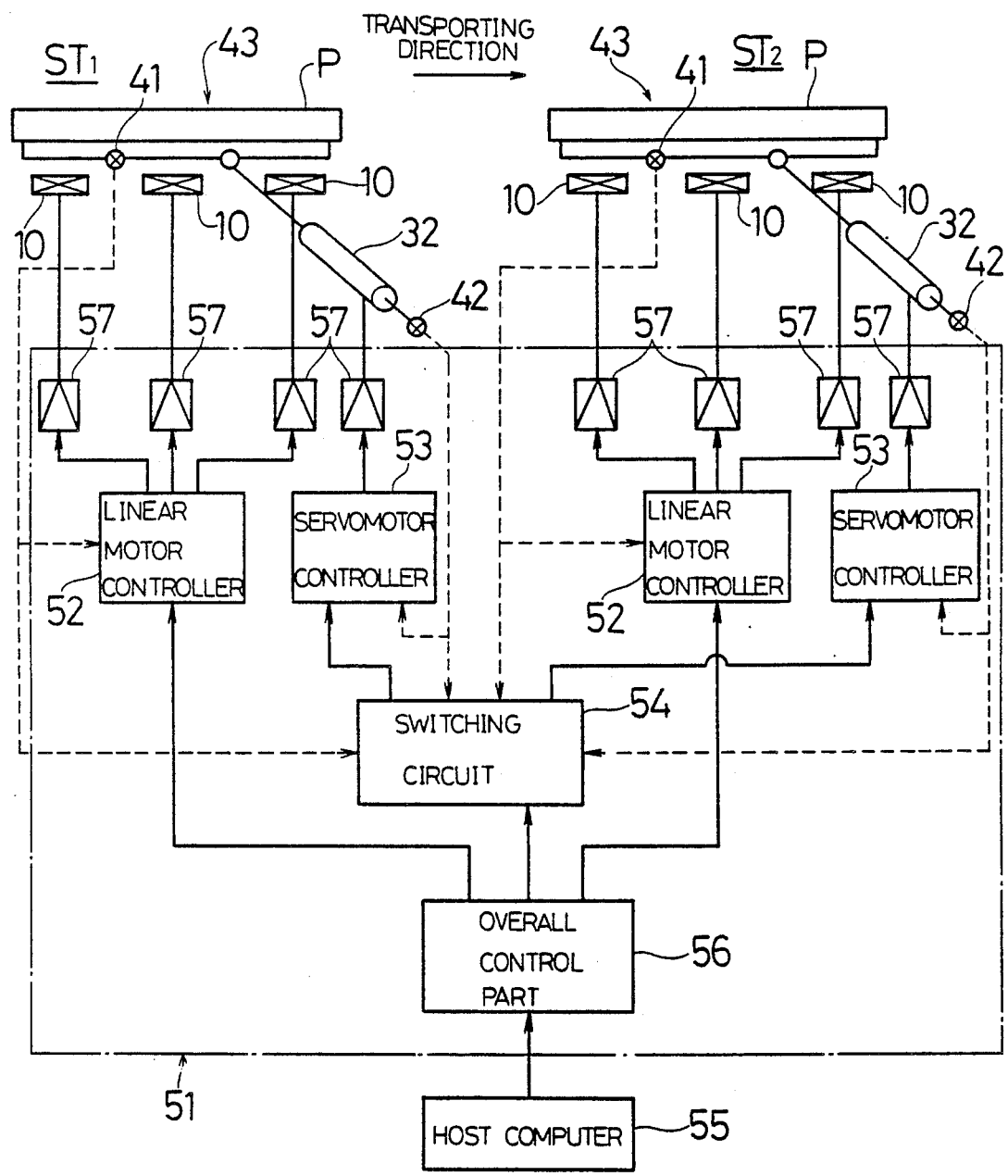

After the pallet P (an article to be conveyed) is conveyed to the working station $ST_2$ at the downstream side, by turning the rod 21 about the axis 18 clockwise (FIG. 1) by extending operation of the cylinder 16, engagement of the engaging block 20 with the engaging projection member 19 is released and the engaging block 20 is shunted downward. In this state, the reaction member 14 which is at the working station $ST_2$ on the downstream side is moved back to the working station $ST_1$ at the upstream side. When the pallet P moved on rollers 2 of the roller conveyor 3 by the operation of the linear motor unit 23, for example, there are caused fluctuations in vertical direction but the fluctuations are absorbed by the coil spring 22 wound round the rod 21 and thus the fluctuations in vertical direction of the reaction member 14 do not occur. As shown in FIG. 6, a speed sensor 41 comprising a pulse generator, etc. which detects the conveying speed for the pallet P between adjoining working stations $ST_1$, $ST_2$ is provided at each station $ST_1$, $ST_2$. An encoder 42 which detects r.p.m. of the servomotor 32 is also provided for each station $ST_1$, $ST_2$. The speed sensor 41 and the encoder 42 compose a conveying state detecting means 42 which detects the conveying state of the pallet P between adjoining working stations $ST_1$, $ST_2$.

FIG. 6 also shows a block diagram of the control part of the conveying apparatus A. In FIG. 6, reference numeral 51 designates a station controller which extends over adjoining working stations $ST_1$, $ST_2$ and controls working of the linear motor unit 23 and the servomotor unit 31 between each working station $ST_1$, $ST_2$. This station controller 51 comprises a linear motor controller 52 which receives output of the speed sensor 41 and controls working of the linear motor unit 23 (more particularly, excitation of the linear motor coil), a servomotor controller 53 which receives output of the encoder 42 and controls working of the servomotor unit 31 (more particularly, rotation of the servomotor 32), a switchover circuit 54 which receives output of the conveying state detecting means 43 (the speed sensor 41 and the encorder 42) and instructs ON/OFF switchover for control to the linear motor controller 52 and the servomotor controller 53 and an overall control part 56 which outputs properly car type information, etc. inputted from a host computer 55 to the linear motor controller 52, the servomotor controller 53 and the switchover circuit 54. Reference numeral 57 designates an amplifier provided at each output part of the linear motor controller 52 and the servomotor controller 53 specifically, the amplifier 57 connected to the linear motor controller 52 comprises a thyristor circuit which carries out phase control, etc.).

Figure 7:
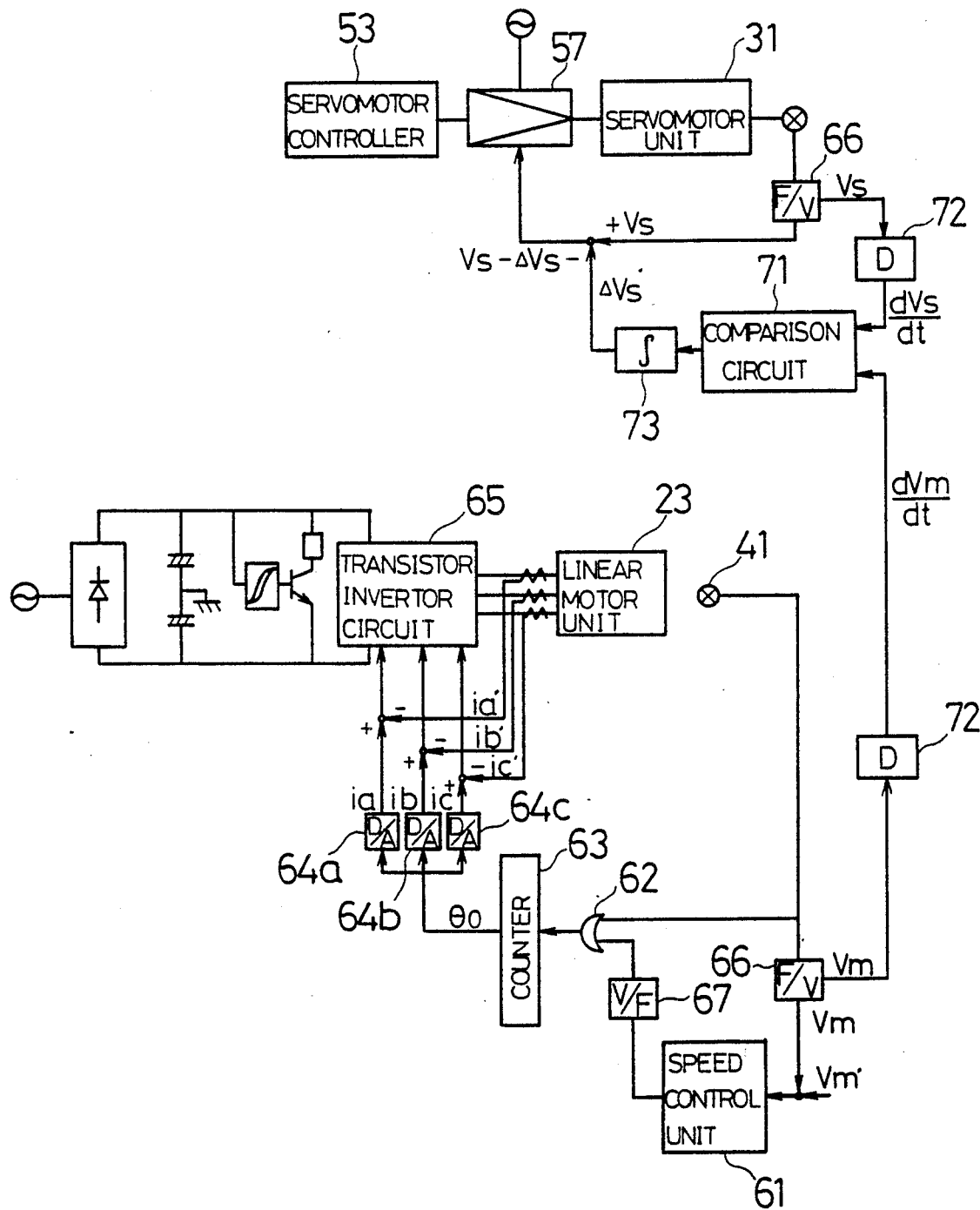
Figure 8:
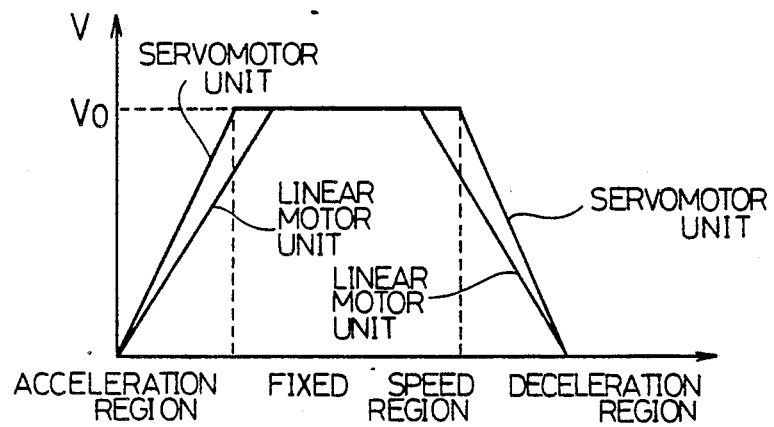

Computation of the electric current command value (amount of excitation to the linear motor coil 10) which is necessary for thrust of the linear motor unit 23 by the station controller 51 and computation of the electric current command value (turning force of the servomotor 32) which is necessary for thrust of the servomotor unit are explained below, with reference to FIGS. 7 and 8. FIG. 7 shows a control circuit and FIG. 8 shows a characteristic of the set speed to the time.

In FIG. 7, reference numeral 61 designates a speed control unit. The difference between a speed command vm' and an actual conveying speed vm detected by the speed sensor 41 is inputted to the speed control unit 61. Reference numeral 62 designates an OR circuit which receives pulse singals to be outputted from the speed control unit 61 and pulse signals to be outputted from the speed sensor 41. Reference numeral 63 designates a counter which count pulse singals to be outputted from the OR circuit 62 and outputs singals of turn-on-angle $\theta_0$ to three digital/analog transducers 64a, 64b, 64c. The three digital/analog transducers 64a, 64b, 64c are for obtaining electric current command values ia, ib, ic of three-phase AC from turn-on-angle $\theta_0$. Electric current command values ia, ib, ic are obtained from the following formulae (where $k=(\frac{2}{3})^{\frac{1}{2}}$)

$$ia = K.i.\sin\theta_0$$

$$ib = K.i.\sin(\theta_0 - 2\pi/3)$$

$$ic = K.i.\sin(\theta_0 + 2\pi/3)$$

Electric current command singals are outputted from each of the digital/analog transducers 64a, 64b, 64c to a transistor inverter circuit 65. In the transistor inverter circuit 65, excitation control on the linear motor coil 10 is carried out on the basis of the electric current command singal and feedback control is effected on the basis of the difference between actual electric current values ia', ib', ic' and the above electric current command values ia, ib, ic. In FIG. 7, reference numeral 66 designates a frequency/voltage transducer interposed between the speed sensor 41 and the speed control unit 61. Reference numeral 67 designates a voltage/frequency transducer interposed between the speed control unit 61 and the OR circuit 62.

Reference numeral 71 designates a comparison circuit. Inputted to this comparison circuit 71 is a deviation dvs/dt−dvm/dt between dvm/dt (or the rising acceleration and the falling deceleration of the linear motor unit 23) obtained by converting the actual conveying speed vm from the speed sensor 41 by frequency/voltage converter 66 and then by differentiating it by a differential circuit 72 (gradients in the acceleration region and the deceleration region of the linear motor unit 23 shown in FIG. 8) and dvs/dt (or the rising acceleration and the falling deceleration of the servomotor unit 31) obtained by converting the actual conveying speed from the encorder 42 by the frequency/voltage converter 66 and the differentiating it by the differential circuit 72 (gradients in the acceleration region and the deceleration region of the servomotor unit 31 shown in FIG. 8). In this comparison circuit, in order to keep constant the deviation dvs/dt−dvm/dt between the units 23 and 31 in the acceleration and deceleration, the deviation a per minute length of time which is always necessary between gradients of the rising acceleration/falling deceleration of the servomotor unit 31 and the linear motor unit 23 is detected from the deviation dvs/dt−dvm/dt. Thus, even if a disturbing element, such as friction, acts on the servomotor unit 31 and the linear motor unit 23, the constant difference in the gradient $\epsilon=(dvs/dt-dvm/dt-a)$ which is always necessary is compensated for.

Reference numeral 73 designates a differential circuit which integrates the constant difference in gradient $\epsilon=(dvs/dt-dvm/dt-a)$ between the servomotor unit 31 and the linear motor unit 23 computed at the comparison circuit 71. The speed deviation (deviation in absolute value between both units 23 and 31) $\int \epsilon dt = \Delta vs$ is computed by an integral circuit 73. The difference between the speed deviation $\Delta vs$ and the actual conveying speed vs from the encorder 42 or $vs - \Delta vs$ is outputted to the amplifier 57 of the servomotor controller 53. In the amplifier 57 of the servomotor controller 53, while the rotation control of the servomotor 32 is effected on the basis of the electric circuit command signal, the feedback control is effected on the basis of the difference between the actual conveying speed vs by the encorder 42 (on the servomotor unit 31 side) and the speed deviation $\Delta vs$ (comparison between the actual conveying speed vm by the speed sensor 41 on the linear motor unit 23 side and the actual conveying speed vm by the encorder 42).

An explanation is made below about the operation of the above embodiment. In the case where the pallet P with the body B placed thereon is conveyed by the linear motor unit 23 from the station $ST_1$ on the upstream side to the station $ST_2$ on the downstream side, under the control of one station controller 51 for the adjoining working stations $ST_1$, $ST_2$, by thrust of the linear motor unit 23 generated at the reaction member 14 by electromagnetic action between the linear motor coil 10 and the reaction member 14 and by thrust of the servomotor unit 31 generated by turning force of the servomotor 32, the pallet P with the body B thereon is conveyed in acceleration until the specified velocity $v_0$ is reached on the basis of characteristic of set velocity to the time of both units 23, 31 in the acceleration region and is further conveyed in deceleration until it stops from the specified velocity $v_0$ on the basis of characteristic of set velocity to the time of both units 23, 31 in the deceleration region, as shown by FIG. 8. When the pallet P reaches the specified velocity $v_0$, the linear motor unit 23 stops (excitation of the linear motor coil 10 stops) and the pallet P is conveyed in the fixed speed region at the fixed speed $v_0$ by thrust of the servomotor unit 31.

When the pallet P is conveyed in the acceleration region and the deceleration region, according to the control circuit shown in FIG. 7 an electric current command value which is necessary for thrust of the linear motor unit 23 from the speed sensor 41 is computed so that it becomes characteristic of rising acceleration in the acceleration region, namely, characteristic of set velocity to the time shown in FIG. 8, and also characteristic of falling deceleration in the deceleration region, namely, characteristic of set velocity to the time shown in FIG. 8. By the station controller 51, the difference between the characteristic value of the set velocity to the time of the servomotor unit 31 and the characteristic value of the set velocity to the time of the linear motor unit 23 is set a little higher so that the speed increases gradually from the low speed side to the high speed side.

When the pallet P is conveyed between adjoining working stations $ST_1$, $ST_2$, while the amount of excitation of the linear motor coil 10 is controlled (control at acceleration and deceleration), turning force of the servomotor 32 is controlled on the basis of the electric current command value.

Thus, characteristic of the set velocity to the time of the servomotor unit 31 in relation to that of the linear motor unit 23 is so set that the difference in characteristic value between the two increases gradually from the low speed side toward the high speed side and therefore, even if both the linear motor unit 23 and the servomotor unit 31 are used jointly in the acceleration region (low speed region), thrust of the linear motor unit 23 (accelerating force due to turning force) does not exceed that of the servomotor unit 31 (accelerating force due to amount of excitation) and thrust of the servomotor unit 31 at low speed is assisted effectively by the linear motor unit 23 which generates large thrust at low speed. Therefore, breaking phenomenon (internal generation of electricity) by the servomotor unit 31 in the acceleration region can be prevented accurately. On the other hand, if the linear motor unit 23 and the servomotor unit 31 are used jointly in the deceleration region, thrust (decelerating force) of the servomotor unit 31 is assisted effectively by thrust (accelerating force) of the linear motor unit 23 and decelerating function at deceleration can be enhanced by utilizing breaking phenomenon by the servomotor unit 31 in the deceleration region.

In addition, if the linear motor unit 23 and the servomotor unit 31 which are different from each other in characteristic of set velocity to the time are used jointly, the servomotor unit 31 which generates small thrust is assisted by the linear motor unit 23 which generates large thrust at starting and therefore slip of the servomotor unit 31 which is easy to be caused due to the difference between the set velocity and the actual velocity caused by small thrust in the low speed region (acceleration region and deceleration region) can be prevented accurately.

Moreover, since the characteristic of set velocity to the time of the servomotor 31 and that of the linear motor unit 23 are set a little high so that both increase gradually from the low speed side to the high speed side, the closer to the speed $v_0$ of the fixed speed region, the less the dependency of the servomotor unit 31 upon the linear motor unit 23 and the position precision at each speed change point (from the acceleration region to the fixed speed region and from the fixed speed region to the deceleration region) by the servomotor unit 31 having high positioning precision becomes accurate and precision of conveyance control throughout the whole operating region can be enhanced.

Since conveyance is effected by driving by the linear motor unit 23 and the servomotor unit 31 in the acceleration region and in the deceleration region and by driving by the servomotor unit 31 in the fixed speed region (intermediate part of conveyance), even if the linear motor unit 23 breaks down, conveyance can be maintained because the servomotor unit 31 is driving at all times at the time of conveyance and even if the servomotor unit 31 breaks down, conveyance in the fixed speed region at the conveyance intermediate stage which is substantially an open-loop can be carried out by the force of inertia based on thrust of the linear motor unit 23 in the acceleration region at the initial stage of conveyance. Thus, conveyance can be maintained even if either one of the units 23, 31 is inoperable.

An explanation is made below about the second embodiment of the present invention.

Figure 9:
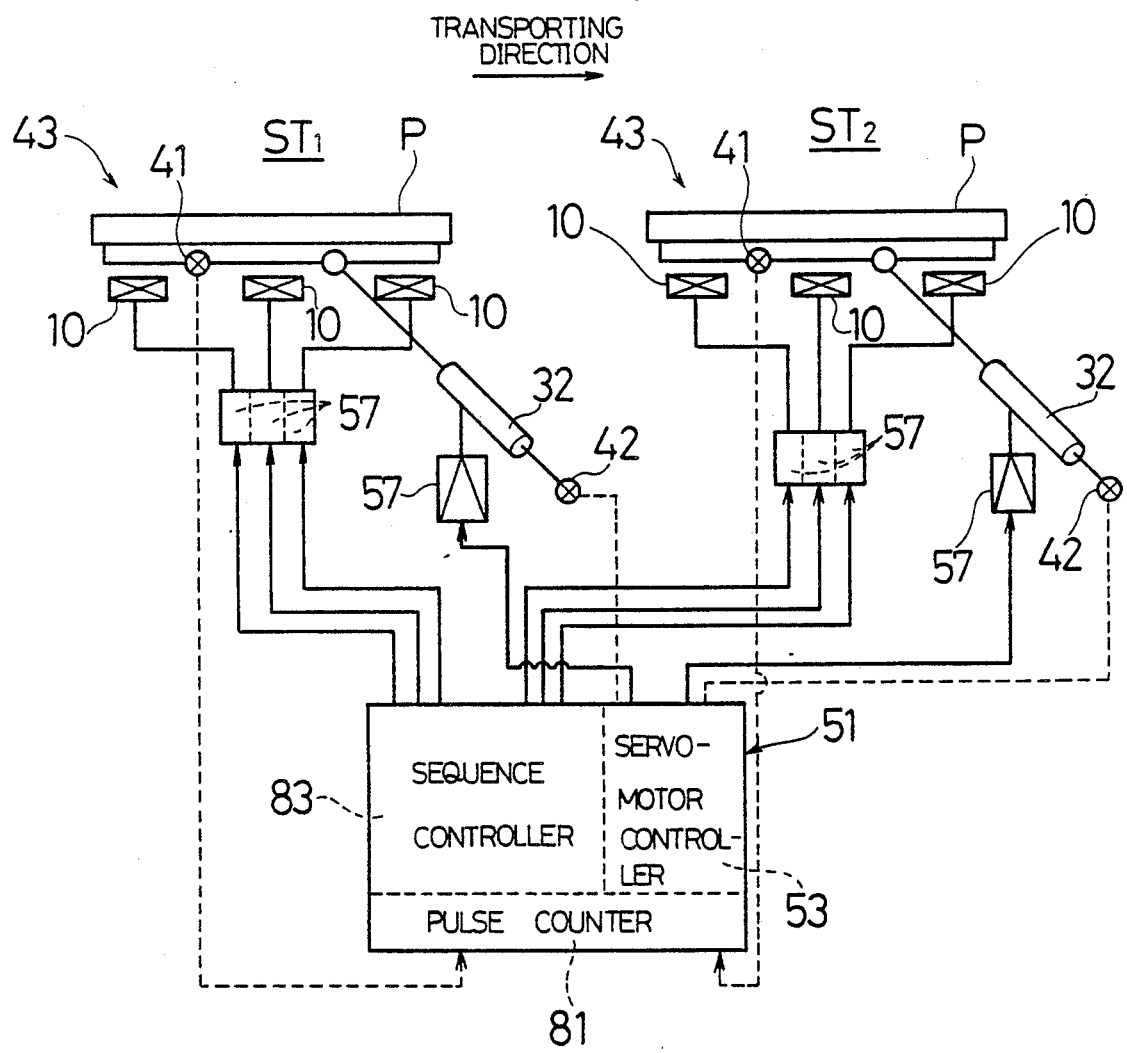

The second embodiment is to effect the deceleration conveyance only by the servomotor unit of high positioning precision at a point preceding the specified position at which an article being conveyed stops. The explanation is made on the basis of FIGS. 9-11.

The station controller 51 comprises a pulse counter 81 which receives signals (speed information) from speed sensors 41, a servomotor controller 53 which controls working of the servomotor unit 31, receives signals (rotation information) from encoders 42 and feedback-controls the position information of the pallet P between working stations $ST_1$, $ST_2$, and a sequence controller 83 which receives the position information of the pallet P from the servomotor controller 53 and outputs ON/OFF command signals to amplifiers 57 of each linear motor coil 10. The sequence controller 83 receives the position information of the pallet P from the servomotor controller 53 and outputs ON command signals to amplifiers 57 for exciting each linear motor coil 10 to the maximum. It also outputs OFF command signals, after receipt of the position information of the pallet P from the servomotor controller 53, to amplifiers 57 for preventing each linear motor coil 10 form the exciting.

Figure 11:
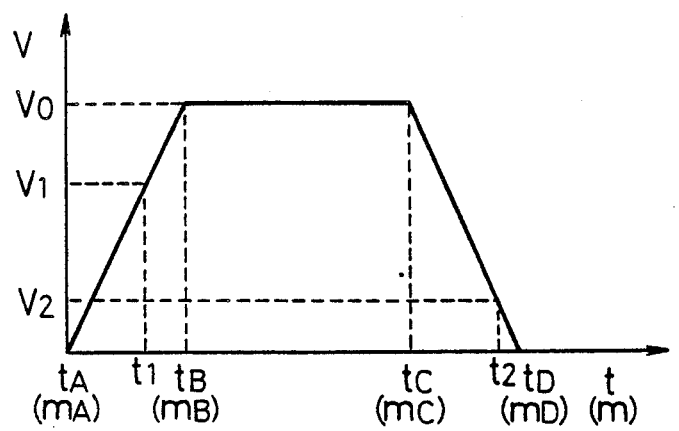
Figure 10:
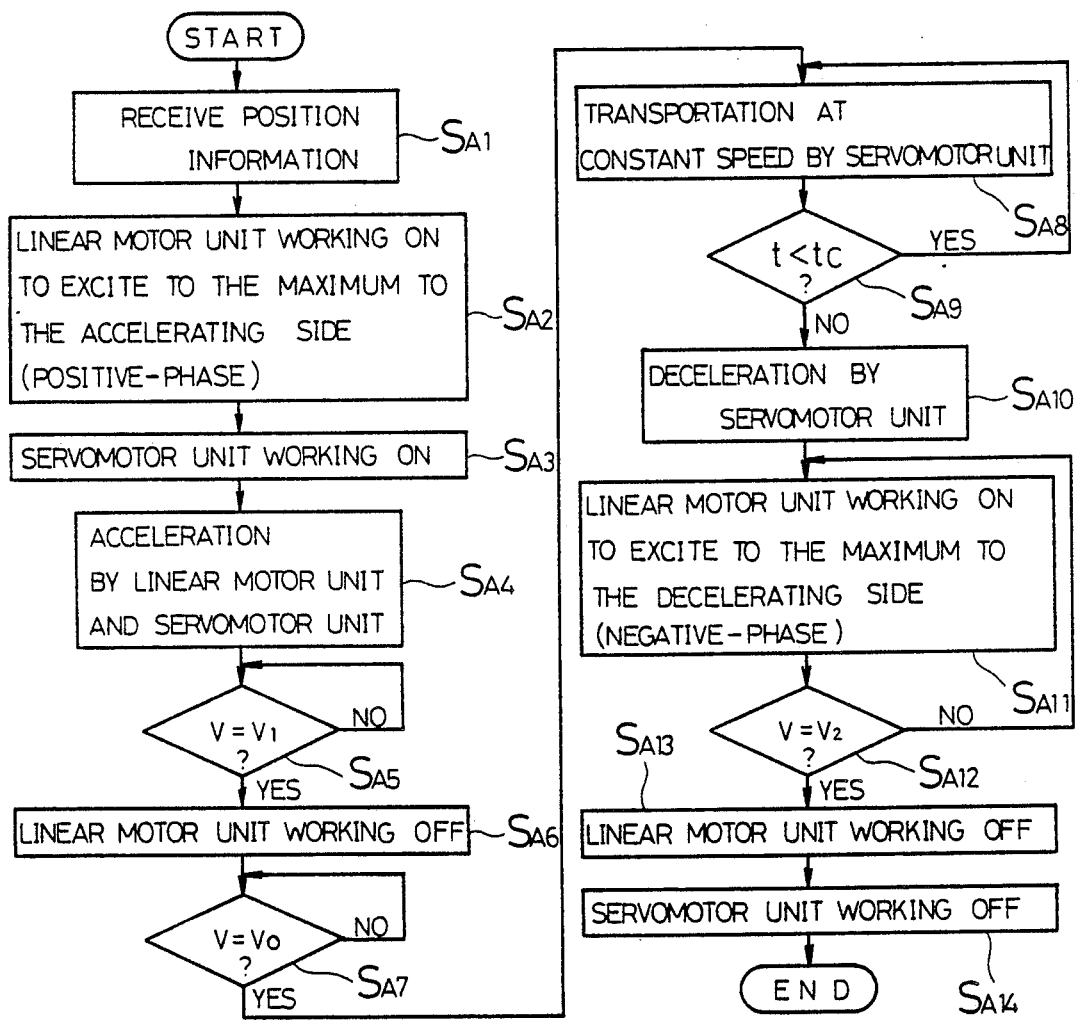

Controlling on conveyance of the pallet P on the basis of the control on working of the linear motor unit 23 and the servomotor unit 31 by the station controller 51 is explained below, with reference to FIGS. 10 and 11. FIG. 10 shows a control flow and FIG. 11 shows a speed change in conveyance.

In FIG. 10, at the step $S_{A1}$, the position information of the pallet P from the servomotor controller 53 is inputted to the sequence controller 83. At the step $S_{A2}$, working of the linear motor unit 23 is started so as to excite to the maximum the linear motor coil 10 to the accelerating side (positive-phase) and at the step $S_{A3}$, the servomotor controller 53 is made ON in synchronization with the working of the linear motor unit 23 to start working of the servomotor unit 31. Then, at the step $S_{A4}$ acceleration of the linear motor unit 23 and the servomotor unit 31 is started. Also, speed v after starting of acceleration by the linear motor unit 23 and the servomotor unit 31 is measured and the lapse of time t from the point of time $t_A$ when acceleration conveyance was started is also measured.

At the step $S_{A5}$, it is judged whether or not the speed v after starting of acceleration has become equal to the speed $v_1$ of the acceleration point $t_1$ before the specified time at which the end of acceleration region shifts to the conveyance intermediate region (refer to FIG. 11) and if judgement is YES, namely, if the speed v has reached the speed $v_1$ at the accelerating point $t_1$, at the step $S_{A6}$ working of the linear motor unit 23 is stopped (OFF) by the OFF command signal from the sequence controller 83 which received position information of the pallet P and acceleration is effected only by driving by the servomotor unit 31. Until the speed v after starting of acceleration reaches the speed $v_1$, namely, the period of time between the point of time $t_A$ (when acceleration conveyance is started) and the acceleration point $t_1$, has significance as a synchronizing period of time for synchronizing the driving by the linear motor unit 23 with the driving by the servomotor unit 31.

At the step $S_{A7}$, it is judged whether or not the speed v has become equal to the speed $v_0$ at the point of time when the fixed speed conveyance is started and if judgment is YES, namely, if the speed v has reached the speed $v_0$ at the point of time $t_B$ when the fixed speed conveyance is started, at the step $S_{A8}$ the pallet P is conveyed at the fixed speed or the speed $v_0$ at the fixed speed conveyance starting point of time $t_B$ by driving by only the servomotor unit 31. Then, at the step $S_{A9}$ it is judged whether or not the lapse of time t is smaller than the deceleration conveyance starting point of time $t_C$ and if judgment is NO (deceleration conveyance starting point of time elapsed), at the step $S_{A10}$ deceleration is started by working braking by the servomotor unit 31 and at the step $S_{A11}$ working of the linear motor unit 23 is started so as to excite to the maximum the linear motor coil 10 to the deceleration side (negative-phase) by ON command signal from the sequence controller 83 which received position information of the pallet P and deceleration is started by working braking by the linear motor unit 23.

Then, at the step $S_{A12}$ it is judged whether or not the speed v after starting of deceleration has become equal to the speed $v_2$ at the deceleration point $t_2$ before the specified time of stop position $t_D$ at the end of deceleration region and if judgment is YES, namely, if the speed v has reached the speed $v_2$ at the decelerating point $t_2$, at the step $S_{A13}$ working of the linear motor unit 23 is stopped so as to prevent the linear motor coil 10 from exciting by OFF command signal from the sequence controller 83 which received position information of the pallet P and braking by the linear motor unit 23 is suspended.

Then, at the step $S_{A14}$ time of lapse t reaches the stop position $t_D$ and working of the servomotor unit 31 is stopped. Thus, conveyance of the pallet P between working stations $ST_1$, $ST_2$ by the station controller 51 terminates.

In the second embodiment, in the case where the pallet P with the body B placed thereon is conveyed between adjoining stations $ST_1$, $ST_2$, under the control of the station controller 51, effective deceleration conveyance by the linear motor unit 32 and the servomotor unit 31 is carried out in the deceleration region having its starting point at the deceleration conveyance starting point of time $t_C$ as a speed change point where the fixed speed conveyance in the intermediate region shifts to the deceleration region and deceleration conveyance only by the servomotor unit 31 of high positioning precision is carried out at the decelerating point $t_2$ before the specified point of time at which the end of the deceleration region stops. Therefore, even if the conveying speed varies due to driving by the linear motor unit 23 which becomes a substantial open-loop control system by control of working on the basis of indirect conveying speed from the speed sensor 41, no discrepancy is caused between the actual measurement and the set value at the deceleration conveyance starting point of time $t_C$ where deceleration is started after conveyance is shifted from the fixed speed conveyance of the intermediated region to the deceleration region by driving by the servomotor unit 31 of high positioning precision. Thus, after grasping accurately the deceleration conveyance starting point of time $t_C$ where the intermediate region is shifted to the deceleration region, deceleration conveyance is carried out by combined use of the linear motor unit 23 and the servomotor unit 31 and effective improvement of the stop position precision can be planned.

Moreover, since the linear motor coil 10 is controlled only by ON/OFF command signals from the sequence controller 83 and in the low speed region (acceleration region and the deceleration region) it is controlled by driving force by the linear motor unit 23 and the driving force by the servomotor unit 31 which makes up for driving force of the linear motor unit 23, control by the linear motor unit 23 can be done only by switching of ON state where the linear motor coil 10 is caused to generate maximum excitation (maximum thrust) and OFF state where thrust by the servomotor unit 31 is sufficient. Thus, the linear motor controller provided with complicated control system, etc. which are necessary for effecting control on the basis of the conveying speed form the speed sensor can be dispensed with, a load on the control system (sequence controller 83) of the linear motor unit 23 is lessened, lowering of reliability and breakdown of the control system of the linear motor unit 23 can be eliminated and the control system of the linear motor unit 23 can be simplified.

An explanation is made below about the third embodiment. The third embodiment is to carry out conveyance by driving by only the servomotor unit 31 at the point before the specified point of time where the end of the acceleration region shifts to the intermediate region and an explanation of it is made on the basis of FIG. 12.

In this embodiment, a limit switch LS for deceleration is provided for each working station $ST_1$, $ST_2$. This limit switch LS for deceleration is so designed that when an optical switch (not shown in the drawing) provided at the undersurface of the pallet P is positioned on the limit switch LS for deceleration, an ON signal is outputted but otherwise OFF signals are outputted. The speed sensor 41, the encoder 42 and the limit switch LS for deceleration compose the conveying state detecting means 43 which detects conveying state of the pallet P between adjoining stations $ST_1$, $ST_2$.

It is so designed that ON/OFF signals from the limit switch LS for deceleration are inputted to the sequence controller 83. While the sequence controller 83 receives ON signals from the limit switch LS for deceleration and position information of the pallet P from the servomotor controller 53 and outputs ON command signals to the amplifiers 57 for exciting to the maximum (negative-phase) each linear motor coil 10, it receives OFF signals from the limit switch LS for deceleration and position information of the pallet P from the servomotor controller 53 and outputs OFF command signals to the amplifiers 57 for preventing each linear motor coil 10 from exciting. When the sequence controller 83 outputs ON command signals to the amplifiers 57 for exciting each linear motor coil 10 to the maximum (positive-phase), control is effected only by position information of the pallet P from the servomotor controller 53.

An explanation is made below about the control on conveyance of the pallet P on the basis of the control on the linear motor unit 23 and the servomotor unit 31 by the station controller 51, with reference to the control flow of FIG. 12.

Figure 12:
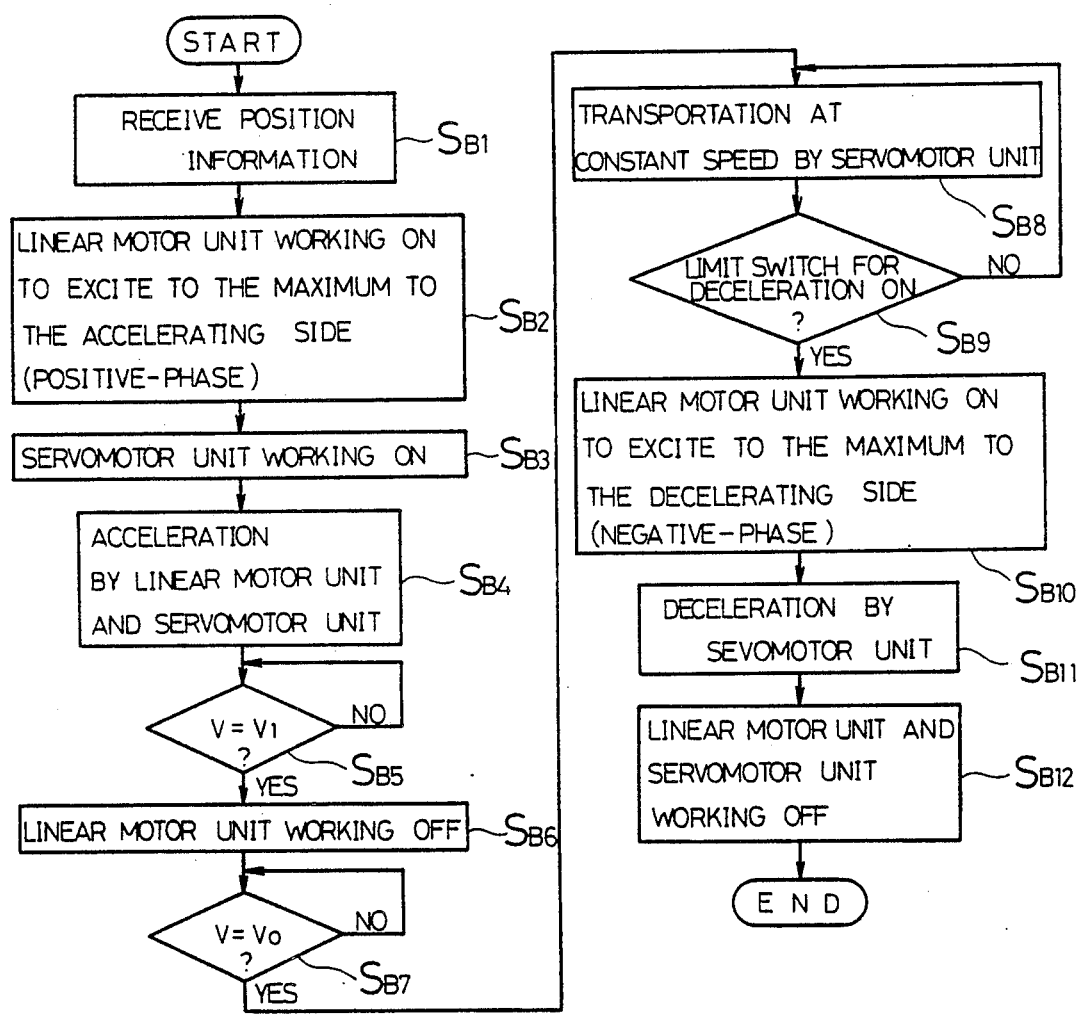
FIG. 12 shows the third embodiment of the present invention and is a flow chart showing the control flow.

In FIG. 12, at the step $S_{B1}$ position information of the pallet P from the servomotor controller 53 is inputted to the sequence controller 83 and at the step $S_{B2}$ working of the linear motor unit 23 is started so as to excite to the maximum the linear motor coil 10 to the accelerating side (positive-phase) by the ON command signal from the sequence controller 83 which received position information of the pallet P. At the step $S_{B3}$ working of the servomotor unit 31 is started by making the servomotor controller 53 ON in synchronization with the working of the linear motor unit 23. Then, at the step $S_{B4}$ the speed v after acceleration by the linear motor unit 23 and the servomotor unit 31 was started is measured and also the time elapsed from the acceleration conveyance starting point of time $t_A$ is measured.

Then, at the step $S_{B5}$ it is judged whether or not the speed v after start of acceleration has become equal to the speed $v_1$ at the lapse point of time $t_1$ as the point before the specified time when the end of the acceleration region shifts to the intermediate region (refer to FIG. 11) and if judgment is YES, namely, if the speed v has reached the speed $v_1$ of the lapse point of time $t_1$, at the step $S_{B6}$ working of the linear motor unit 23 is stopped by OFF command signal from the sequence controller 83 which received position information of the pallet P.

Then, at the step $S_{B7}$ it is judged whether or not the speed v has become equal to the speed $v_0$ at the fixed speed conveyance starting point of time $t_B$ and if judgment is YES, namely, if the speed v has reached the speed $v_0$ at the fixed speed conveyance starting point of time tB, at the step $S_{B8}$ acceleration of the servomotor unit 31 is stopped and the pallet P is conveyed at the fixed speed or the speed $v_0$ of the fixed speed conveyance starting point of time $t_B$. At the step $S_{B9}$ time elapsed t reaches the deceleration conveyance starting point of time $t_C$, namely, the optical switch of the pallet P is positioned on the limit switch LS for deceleration of the station $ST_2$ and it is judged whether or not the ON signal has been issued from the limit switch LS for deceleration. If judgment is YES, namely, if a forward end of the pallet P is positioned on the limit switch LS on the downstream side (deceleration conveyance starting point of time $t_C$ has elapsed), at the step $S_{B10}$ the linear motor coil 10 is excited to the maximum to the decelerating side (negative-phase) and at the step $S_{B11}$ deceleration is started by working braking by the servomotor unit 31.

Then, at the step $S_{B12}$ the time elapsed t reaches the stop position $t_D$ and working of both the linear motor unit 23 and the servomotor unit 31 stops. Thus, conveyance of the pallet P between adjoining working stations $ST_1$, $ST_2$ terminates.

In this third embodiment, in the case where the pallet P is conveyed between adjoining stations $ST_1$, $ST_2$, under the control of the station controller 51 conveyance is carried out by driving by the linear motor unit 23 and the servomotor unit 31 in the acceleration region (acceleration at the initial stage of conveyance) but at the lapse point of time $t_1$ before the specified time when the end of the acceleration region shifts to the intermediate region, conveyance is carried out by driving by only the servomotor unit 31. Thus, even if conveying speed of the pallet P varies due to driving by the linear motor unit 23 which becomes a substantial open-loop control system by working control on the basis of indirect conveying speed from the speed sensor 41, no discrepancy is caused between the actual measurement and the set value at the fixed speed conveyance starting point of time $t_B$ which is a speed change point where the acceleration region is shifted to the intermediate region, due to the servomotor unit 31 of high positioning precision and the pallet P is conveyed always at the fixed conveying hour. Accordingly, stabilization of control at the time of shifting from the acceleration region to the intermediate region can be planned.

An explanation is made below about the fourth embodiment. This embodiment is to carry out control on the linear motor only by switching of ON state where the maximum thrust generates and OFF state where control can be made only by thrust of the servomotor unit 31. Control on conveyance of the pallet P on the basis of control on working of the linear motor unit 23 and the servomotor unit 31 by the station controller 51 is explained below with reference to the control flow in FIG. 13.

Figure 13:
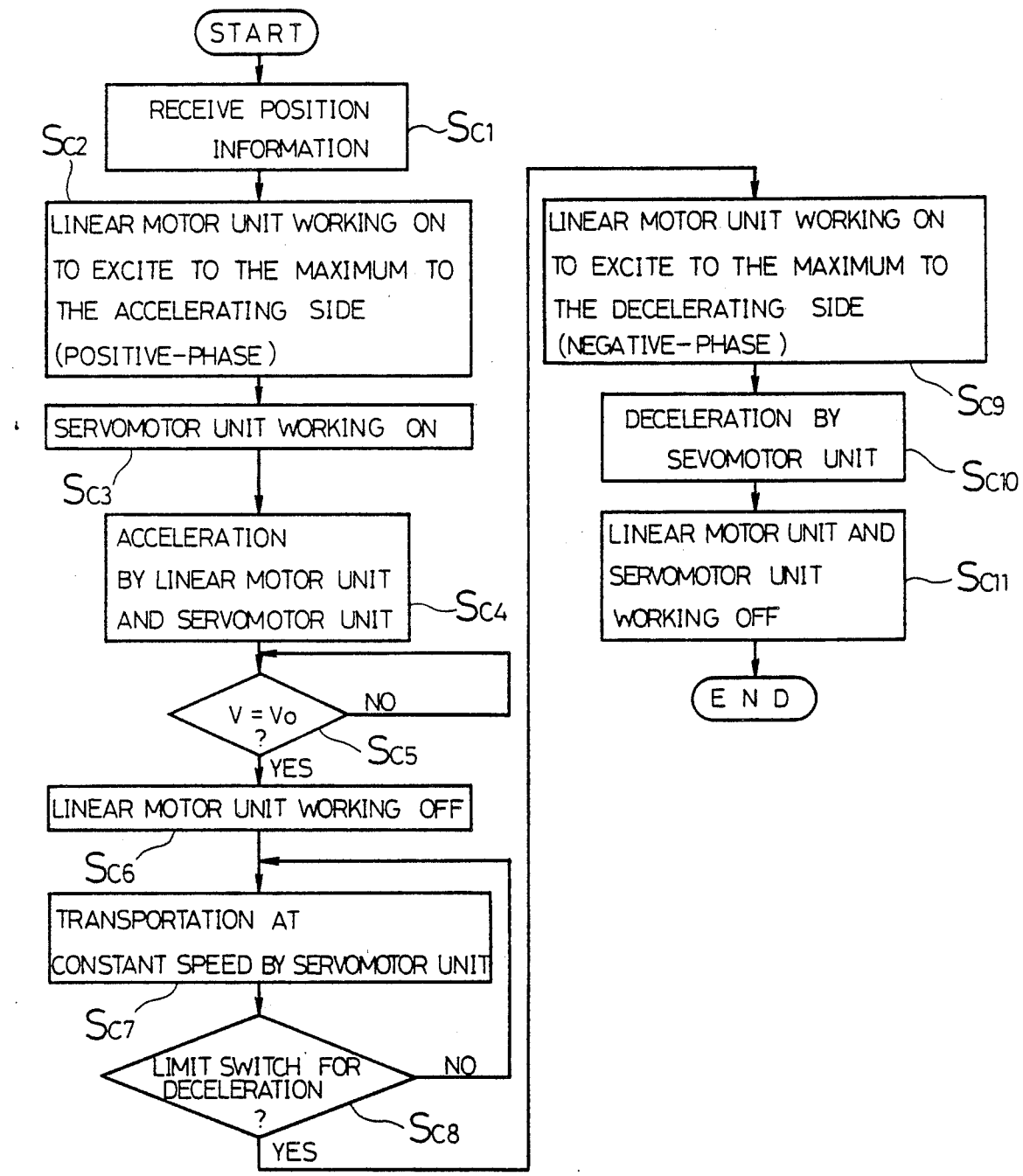
FIG. 13 shows the fourth embodiment of the present invention and is a flow chart showing the control flow.

In FIG. 13, at the step $S_{C1}$ position information of the pallet P from the servomotor controller 53 is inputted to the sequence controller 55 and at the step $S_{C2}$ working of the linear motor unit 23 is started so as to excite the linear motor unit 23 to the maximum to the accelerating side (positive-phase) by the ON command signal from the sequence controller 83 which received position information of the pallet P. At the step $S_{C3}$, working of the servomotor unit 31 is started by making the servomotor controller 53 ON in synchronization with working of the linear motor unit 23. Then, at the step $S_{C4}$ acceleration fo the linear motor unit 23 and the servomotor unit 31 is started. Also, the speed v after acceleration by the linear motor unit 23 and the servomotor unit 31 was started is measured and also the distance m from the point $m_A$ where acceleration conveyance was started is measured.

At the step $S_{C5}$, it is judged whether or not the speed v after start of acceleration has become equal to the speed $v_0$ at the fixed speed conveyance starting point $m_B$ and if judgment is YES, namely, if the speed v has reached the speed $v_0$ at the fixed speed conveyance starting point $m_B$, at the step $S_{C6}$ working of the linear motor unit 23 is stopped by OFF command signal from the sequence controller 83 which received position information of the pallet P and at the step $S_{C7}$ the pallet P is conveyed at the speed $v_0$ of the fixed speed conveyance starting point $m_B$ by driving by only the servomotor unit 31.

Then, at the step $S_{C8}$ distance m conveyed reaches the deceleration conveyance starting point $m_C$, namely, the optical switch of the pallet P is positioned on the limit switch LS for deceleration of the station $ST_2$ on the downstream side, and it is judged whether nor not ON signal has been issued from the limit switch LS for deceleration. If judgment is YES, namely, when the pallet P is positioned on the limit switch LS for deceleration (passes the deceleration conveyance starting point $m_C$), at the step $S_{C9}$ working of the linear motor unit 23 is started so as to excite the linear motor coil 10 to the maximum to the decelerating side (negative-phase) and at the step $S_{C10}$ deceleration is started by working braking by the servomotor unit 31 on the basis of position information of the pallet P.

Then, at the step $S_{C11}$ distance conveyed reaches the stop position $m_D$ and working of both the linear motor unit 23 and the servomotor unit 31 is stopped. Thus, conveyance of the pallet P between adjoining stations $ST_1$, $ST_2$ by the station controller 51 terminates.

In this fourth embodiment, the linear motor coil 10 is controlled only by ON/OFF command signals from the sequence controller 83 and in the low speed region, it is controlled by driving force by the linear motor unit 23 and driving force by the servomotor unit 31 which makes up for driving force of the linear motor unit 23. Therefore, control on the linear motor unit 23 is done only by switching of ON state and OFF state, a load on the control system of the linear motor unit 23 is lessened and trouble of the control system of the linear motor unit 23 can be prevented.

Moreover, since the servomotor unit 31 is driving always during conveyance, conveyance by the linear motor unit 23 is done only in the low speed region and the linear motor unit 32 becomes substantially an open-loop in the intermediate region but this is compensated for by the servomotor unit 31 of high positioning precision. Thus, there is caused no discrepancy at each speed change point (from the conveyance initial stage region to the conveyance intermediate region and from the conveyance intermediate region to the conveyance last region) or at each passing point $m_B$, $m_C$, with the result that stabilization of conveyance and stop position precision are improved and also control precision on conveyance as a whole (initial stage of conveyance, last stage region of conveyance and intermediate region of conveyance) can be planned.

Figure 14:
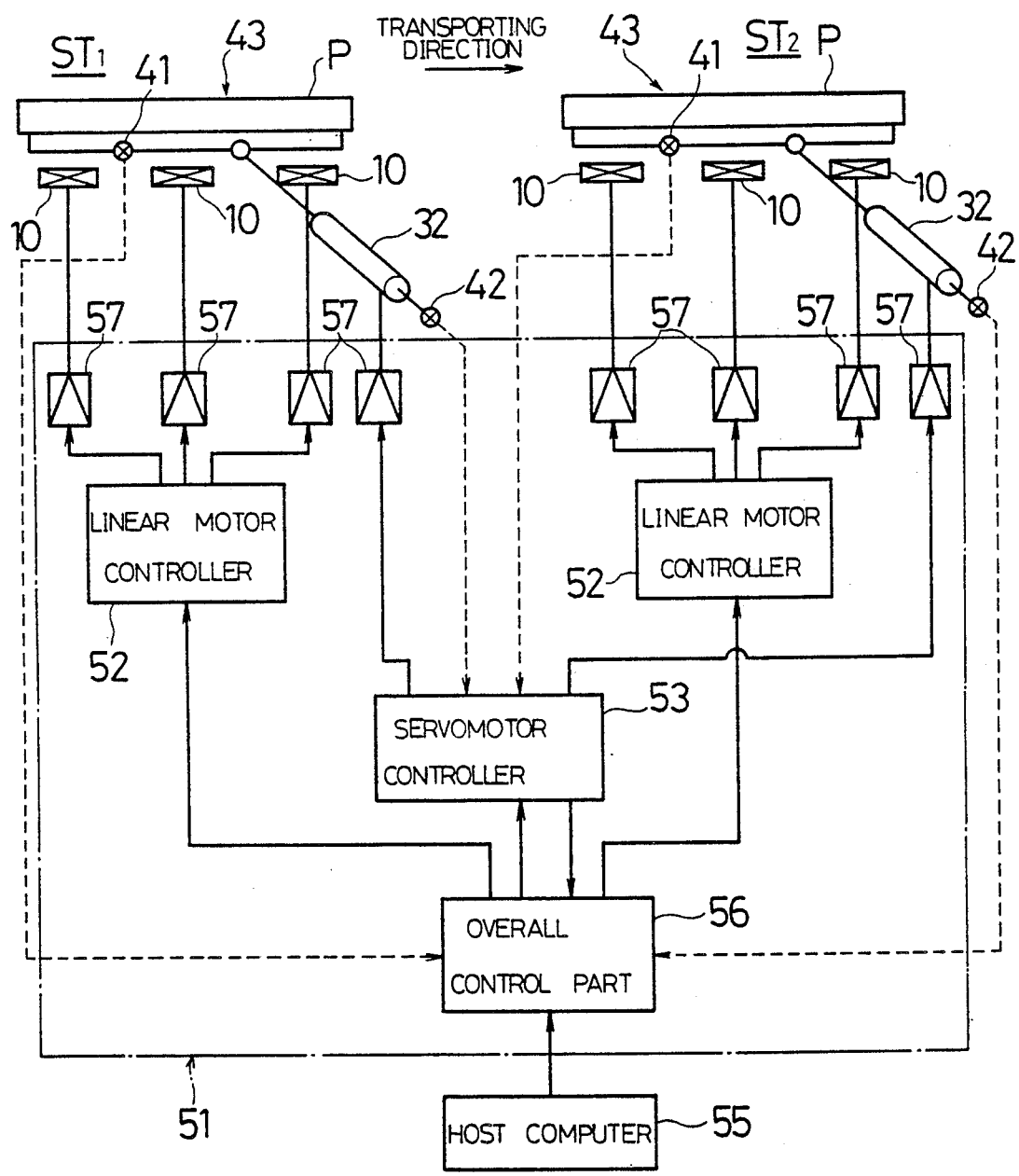

An explanation is made below about the fifth embodiment. This fifth embodiment is to dispense with a changeover circuit which receives output from the conveying state detecting means and gives instructions of ON/OFF changeover of control to the linear motor controller 52 and the servomotor controller 53. The explanation is made with reference to FIG. 14 and FIG. 15.

The station controller 51 comprises the linear motor controller 52 which controls working of the linear motor unit 23, the servomotor controller 53 which controls working of the servomotor unit 31 and feedback-controls position information of the pallet P between each working station $ST_1$, $ST_2$, and an overall control part 56 which receives output from the servomotor controller 53, gives instructions of ON/OFF changeover of control to the linear motor controller 52 and the servomotor controller 53 (servomotor 52) and gives command values of acceleration and deceleration to the linear motor controller 52 on the basis of speed information from the sensors 41.

Control on conveyance of the pallet P on the basis of control on working of the linear motor unit 23 and the servomotor unit 31 by the station controller 51 is explained below, with reference to the control flow in FIG. 15.

Figure 15:
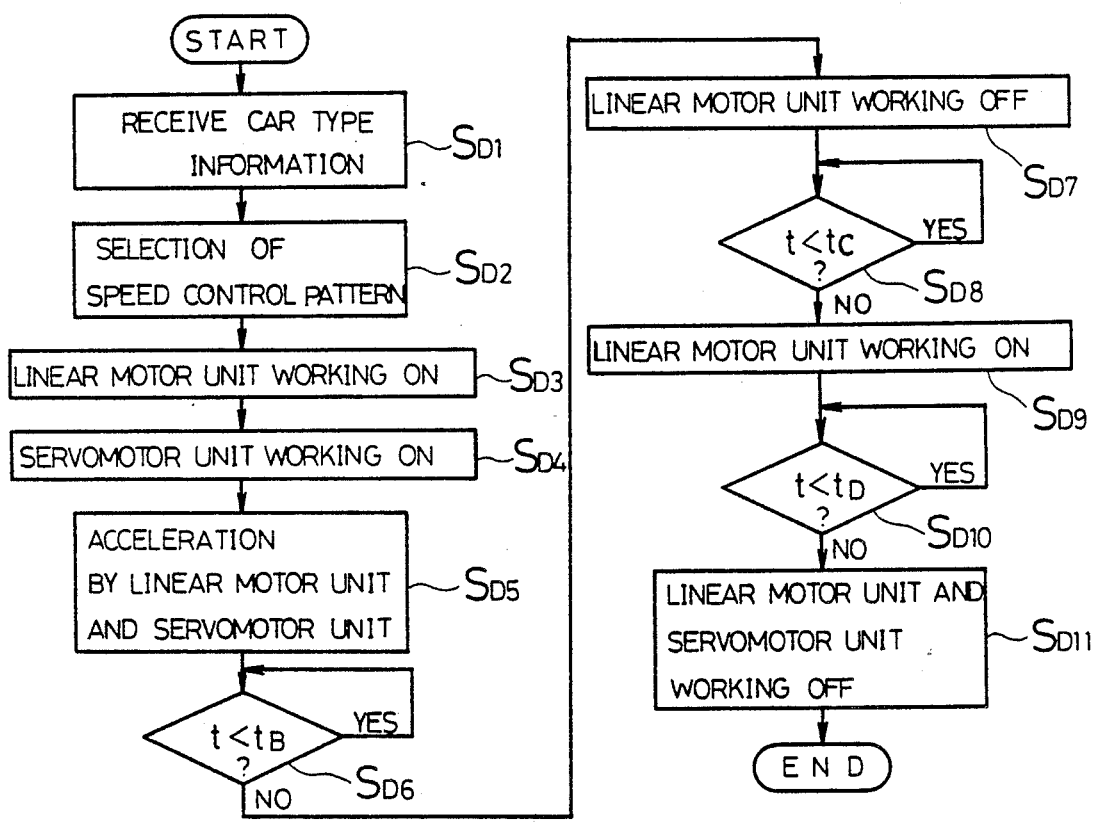
Figure 16:
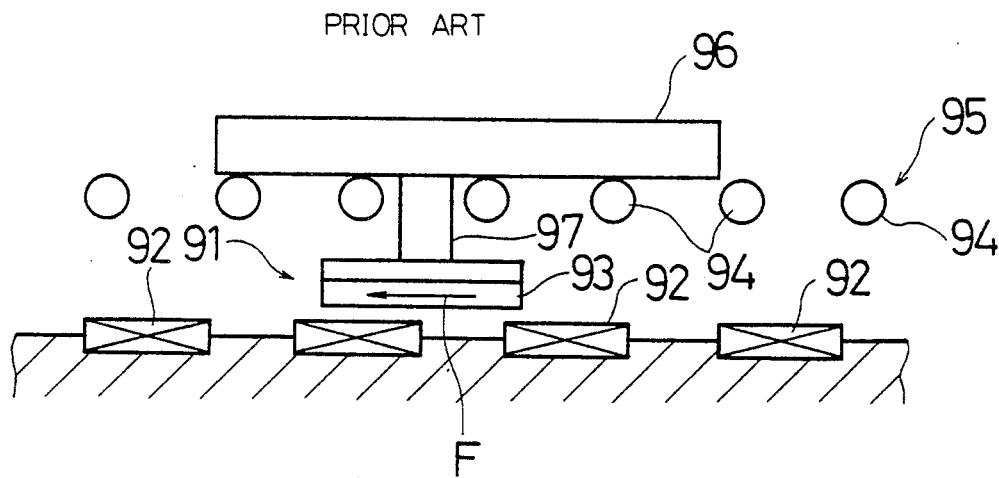
FIG. 16 is a side view of the conventional conveyor means.
Figure 17:
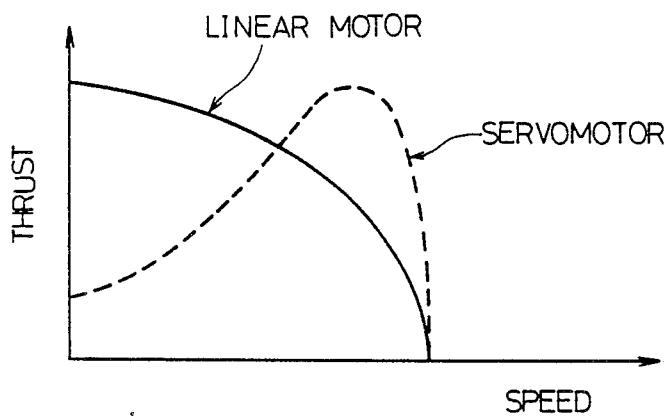
FIG. 17 is a characteristic drawing showing the thrustspeed characteristic of the linear motor and the servomotor.
Figure 18:
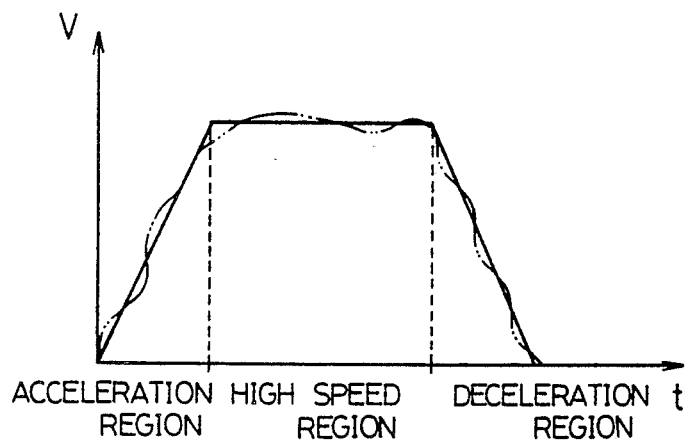
FIG. 18 is a characteristic drawing showing variations of conveying speed in the case where driving by the linear motor is carried out in the low speed region and driving by the servomotor is carried out in the high speed region.

In FIG. 15, at the step $S_{D1}$ car type information is received and at the step $S_{D2}$ a speed control pattern is selected according to car types (in its turn, weight of a pallet including weight of articles placed thereon, such as the body B). Then, at the step $S_{D3}$ working of the linear motor unit 23 is started in accordance with the speed control pattern selected and at the step $S_{D4}$ working of the servomotor unit 31 is started by making the servomotor controller 53 ON in synchronization with working of the linear motor unit 23. At the step $S_{D5}$, deceleration by the linear motor unit 23 and the servomotor unit 31 is started and the time elapsed t from the acceleration conveyance starting point of time $t_A$ of the linear motor unit 23 and the servomotor unit 31 is measured.

Then, at the step $S_{D6}$ it is judged whether or not the time elapsed t is smaller than the fixed speed conveyance starting point of time $t_B$ (refere to FIG. 11) and if judgment is NO, namely, when the fixed speed conveyance starting point of time $t_B$ elapsed, at the step $S_{D7}$ working of the linear motor unit 23 is stopped by making the linear motor controller 52 OFF and the pallet P is conveyed by driving by only the servomotor unit 31.

Then, at the step $S_{D8}$ it is judged whether or not the time elapsed t is smaller than the deceleration conveyance starting point of time $t_C$ and if judgment is NO, namely, when the deceleration conveyance starting point of the $t_C$ elapsed, at the step $S_{D9}$ deceleration is started by working braking by the linear motor unit 23 and the servomotor unit 31.

Then, at the step $S_{D10}$ it is judged whether or not the time elapsed t is smaller than the stop point of time $t_D$ and if judgment is NO, namely, the stop point of time $t_D$ elapsed, at the step $S_{D11}$ working of both the linear motor unit 23 and the servomotor unit 31 is stopped. Thus, conveyance of the pallet P by the station controller 51 between adjoining working stations $ST_1$, $ST_2$ terminates.

In the fifth embodiment, in the case where the pallet P with the body B placed thereon is conveyed between adjoining stations $ST_1$, $ST_2$, under the control of the station controller 51 conveyance is carried out by driving of both the linear motor unit 23 and the servomotor unit 31 in the conveyance initial stage region which is the acceleration region at the initial stage of conveyance and the conveyance last stage region which is the deceleration region at the last stage of conveyance but in the conveyance intermediate region which is the fixed speed region at the conveyance intermediate stage conveyance is carried out by driving by the servomotor unit 31. In a word, in this embodiment, too, since the servomotor unit 31 is driving at all times during conveyance, conveyance by the linear motor unit 23 is carried out only in the low speed region and the linear motor unit 23 becoming substantially an open-loop as the whole control is compensated for by the servomotor unit 31 of high positioning precision, discrepance which can be caused at each speed change point (from the acceleration region which is the conveyance initial stage region to the fixed speed region which is the conveyance intermediate region and from the fixed speed region to the deceleration region which is the conveyance last stage region) is prevented, stabilization of conveyance and stop position precision are improved and control precision of conveyance as a whole can be planned.

Since conveyance in the low speed region is carried out by the sum of thrust of the linear motor unit 23 and thrust of the servomotor unit 31 in the conveyance initial stage region and the conveyance last stage region, accelerating force and decelerating force in these low speed regions can be improved effectively.

What is claimed is:

1. A conveyor means for conveying articles between stations of a line having a plurality of stations comprising:
    a linear motor unit and a servomotor unit provided at each station;
    conveying state detecting means for detecting conveying state of an article being conveyed between adjoining stations; and
    control means which receives output of said conveying state detecting means and controls working of said linear motor unit and said servomotor unit so that an article conveyed from one of said stations to an adjoining one of said stations is driven by both said linear motor unit and said servomotor unit in at least one of an acceleration region at an initial stage of conveyance and a deceleration region at a last stage of conveyance, and is driven by said servomotor unit in a fixed speed region at an intermediate stage of conveyance.

2. A conveyor means as defined in claim 1, wherein said control means controls working of said linear motor unit and said servomotor unit so as to decelerate an article in at least a part of the deceleration region and to decelerate an article only by said servomotor unit at a point before the specified point of time where the article stops at the last stage of the deceleration region.

3. A conveyor means as defined in claim 1, wherein said control means controls working of said linear motor unit and said servomotor unit so as to convey an article by driving by both said linear motor unit and said servomotor unit at the time of acceleration included in at least a part of the acceleration region and by driving by only said servomotor unit at the point before the specified point of time where the last stage of the acceleration region shifts to the conveyance intermediate region.

4. A conveyor means as defined in claim 1, wherein said control means controls said linear motor unit only by ON/OFF switching and controls said servomotor unit so that driving force of said servomotor unit makes up for driving force of said linear motor unit.

5. A conveyor means as defined in claim 1, wherein said control means, when driving said conveyed article by both said linear motor unit and said servomotor unit in the acceleration region at the initial stage of conveyance, sets characteristics of set velocity to time of said servomotor unit such that it is a little higher than that of said linear motor unit and the difference in characteristic value increases gradually from the acceleration region to the deceleration region.

6. A conveyor means ad defined in claim 1, wherein said control means when conveying an article by both said linear motor unit and said servomotor unit in the deceleration region at the last stage of conveyance, sets characteristics of set velocity to time of said servomotor unit such that said characteristics are higher than corresponding characteristics of said linear motor unit and a difference in characteristic value increases gradually from the acceleration region to the deceleration region.

7. A conveyor means as defined in claim 1, wherein said linear motor unit comprises linear motor coils as stators which are iron cores around which exciting coils are wound, and a reaction member as a rotor which is a laminated sheet of iron and aluminum.

8. A conveyor means as defined in claim 1, wherein said servomotor unit comprises a servomotor oriented to have an axis of rotation facing upward, a rack member extending in a conveying direction with teeth on both sides thereof, a first pinion mounted on the axis of rotation of said servomotor, a second pinion engaging said first pinion and the teeth at one side of said rack member, a third pinion engaging said first pinion at a position opposite to said second pinion, and a fourth pinion engaging said third pinion and the teeth at the other side of said rack member.

9. A conveyor means as defined in claim 1, wherein said conveying state detecting means comprises a speed pulse generator as a speed sensor for detecting a conveying speed for an article and an encoder for detecting r.p.m. of the servomotor unit.

* * * * *